United States Patent
Hisada et al.

(10) Patent No.: US 8,061,217 B2
(45) Date of Patent: Nov. 22, 2011

(54) APPARATUS FOR MEASURING A FLOW RATE OF A POWDER

(75) Inventors: Wataru Hisada, Kitanagoya (JP); Mitsuo Shintani, Suita (JP); Manabu Yamaguchi, Suita (JP); Yoshiki Aramatsu, Suita (JP)

(73) Assignee: Sintokogio, Ltd., Aichi (JP)

( * ) Notice: Subject to any disclaimer, the term of this patent is extended or adjusted under 35 U.S.C. 154(b) by 105 days.

(21) Appl. No.: 12/677,470

(22) PCT Filed: Sep. 8, 2008

(86) PCT No.: PCT/JP2008/066176
§ 371 (c)(1), (2), (4) Date: Mar. 10, 2010

(87) PCT Pub. No.: WO2009/034946
PCT Pub. Date: Mar. 19, 2009

(65) Prior Publication Data
US 2010/0326202 A1 Dec. 30, 2010

(30) Foreign Application Priority Data
Sep. 12, 2007 (JP) .................. 2007-236889

(51) Int. Cl.
*G01F 1/56* (2006.01)
(52) U.S. Cl. .................................... 73/861.08
(58) Field of Classification Search .......... None
See application file for complete search history.

(56) References Cited

U.S. PATENT DOCUMENTS
5,808,242 A 9/1998 Satake et al.
5,929,343 A 7/1999 Yamamoto et al.

FOREIGN PATENT DOCUMENTS
| JP | 5-133785 | 5/1993 |
| JP | 8-337322 | 12/1996 |
| JP | 9-126841 | 5/1997 |
| JP | 2001-21397 | 1/2001 |
| JP | 2002-46068 | 12/2002 |
| JP | 2006-3333 | 5/2006 |
| JP | 3865737 | 10/2006 |
| JP | 2006-329874 | 12/2006 |
| JP | 2007-121272 | 5/2007 |

OTHER PUBLICATIONS
International Search Report, PCT/JP2008/066176, dated Dec. 2, 2008.

*Primary Examiner* — Harshad Patel
(74) *Attorney, Agent, or Firm* — Finnegan, Henderson, Farabow, Garrett & Dunner, L.L.P.

(57) ABSTRACT

An apparatus for measuring a flow rate of a powder when a powder is conveyed by using air as a carrier gas, which apparatus measures the flow rate based on the change of capacitance of the powder to be measured. The apparatus that can measure the flow rate of a powder with high accuracy by compensating for the effect of the thermal drift of the capacitance. It includes a protecting pipe for conveying a powder, a housing pipe having measuring electrodes, and a transducer for outputting an output of the measuring electrode to a display. It further includes an atmospheric temperature sensor and a carrier gas-temperature sensor 31. The sensor 31 is directly fixed to the protecting pipe 20 at a place that does not overlap the housing pipe 10, and includes a circuit for compensating for the output of the measuring electrode, which output is the capacitance determined based on a graph of a curve of the relationship between a capacitance and a flow rate, based on the difference between the output of the atmospheric temperature sensor and the output of the carrier-gas-temperature sensor.

5 Claims, 11 Drawing Sheets

[the width of the detecting electrode]
= [the width of the grounding electrode]

(B)

[the width of the detecting electrode]
> [the width of the grounding electrode]

Relationship between Temperature vs.
Capacitance while Increasing Temperature

Fig. 13

APPARATUS FOR MEASURING A FLOW RATE OF A POWDER

TECHNICAL FIELD

This invention relates to an apparatus for measuring a flow rate of a powder that uses capacitance. Particularly, it relates to a capacitance-type apparatus that can be used for continuously measuring a flow rate of a powder in real time in an apparatus for handling various powders, which apparatus has a conveying means using air (as a carrier gas). Further, the capacitance-type apparatus has a function to correct the measurements by thermal compensation based on the temperature of the environment and the temperature of the carrier gas. Thus, it can measure the flow rate of a powder with high accuracy.

An apparatus for handling various powders using the capacitance-type apparatus for measuring a flow rate of a powder can be illustrated by these examples:
(1) An apparatus for conveying powder through a conveying pipe by using compressed air or depressurized air,
(2) An apparatus for blasting shot to treat surfaces of products, which shot is made from powder and is projected by compressed air or an impeller, and
(3) An apparatus for coating an article by spraying powder by a spray gun (an ejector nozzle).

BACKGROUND OF THE INVENTION

There are Patent Documents 1 and 2. They relate to a capacitance-type apparatus for measuring a flow rate of a powder.

Generally, when a flow rate is measured, the temperature of an object used to measure a flow rate is changed based on the conditions, such as the temperature or humidity of the air (atmosphere) used as a carrier gas. Thus, it is necessary to correct without any delay any errors that may be caused by the change of the temperature of the object.

To solve this problem, Patent Document 1 discloses an invention relating to an apparatus for measuring a flow rate of a powder. It is constituted of:
an electrode ("a measuring electrode") for measuring a capacitance of a powder that can detect a flow rate of a powder based on the change of a capacitance, and which is disposed at the pathway of the flow of the powder, and
an electrode ("an adjusting electrode") for adjusting any errors of the measurements caused by the change of the environmental conditions near the measuring electrode while the air that is used as a carrier gas flows,
wherein the measuring electrode and the adjusting electrode are disposed in parallel. (See claim 1 of Patent Document 1.)

Namely, for the apparatus of Patent Document 1, two identical sensors for measuring a flow rate are disposed in parallel. One sensor is provided to a powder carried by air used as a carrier gas. The other sensor is provided to only air and is used for adjusting any errors of the measurements. Based on the difference between the outputs of the two sensors, the flow rate of the powder can be measured.

However, for the apparatus of Patent Document 1, it is necessary to provide air (as a carrier gas) with properties identical to both the measuring electrode and the adjusting electrode.

For example, when a flow rate of a powder carried by compressed air is measured, compressed air having identical properties must be provided to the adjusting electrode. The compressed air is not used for carrying the powder, and as a result, is uselessly exhausted into the atmosphere. Thus, twice the amount of compressed air is required to measure the flow rate of the powder. Further, when a flow rate of a powder carried by suctioned air is measured, suctioned air with identical properties must also be provided to the adjusting electrode. Thus, twice the amount of suctioned air is also required to measure the flow rate of the powder. For each case, the energy consumed for measuring the flow rate increases.

Patent Document 2 discloses an invention relating to an apparatus for measuring a flow rate of a powder that has a high temperature, ranging from 500-1200° C. (see claim 1 of Patent Document 2). It is constituted of an apparatus for measuring a flow rate of a powder passing through a pipe based on the change of the capacitance, the apparatus comprising:
a pipe for carrying a powder,
electrodes for measuring a flow rate comprising:
a pair of a source electrode and a sensing electrode disposed around the pipe, and facing each other, wherein the electrodes have a curved shape,
a guard electrode disposed between the source electrode and the sensing electrode,
a support structure to hold the electrodes, wherein the structure is concentrically disposed around the pipe and has a tubular shape,
wherein the source electrode and the guard electrode are formed by a heat-resistant and conductive material disposed at the inner surface of the support structure with a spiral pattern.

Namely, for the invention of Patent Document 2, since the powder, having a high temperature (ranging from 500-1200° C.), for measuring its flow rate passes through the pipe, and since the apparatus has a configuration such that the pipe is disposed in the support structure having the electrodes, it can prevent the electrodes from separating from the support structure because of thermal influence.

However, since the powder having a high temperature flows in the pipe, the temperature in the pipe increases. Thus, there is a possibility that the capacitance of the object for measurement will change. Patent Document 2 does not disclose or suggest how the effect caused by the change of the capacitance should be adjusted. Thus, there is a problem in that the measured value of the flow rate changes with time.

There are Patent Documents 3 and 4, relating to an apparatus for measuring a flow rate of a powder that uses capacitance. These documents were filed by the same applicant as that of this application, and do not affect the patentability of this invention.

Patent Document 2: Japanese Patent Laid-open Publication No. 2001-21397
Patent Document 3: Japanese Patent Laid-open Publication No. 2007-121272
Patent Document 4: Japanese Patent Laid-open Publication No. 2006-329874

DISCLOSURE OF INVENTION

Problems to be Solved

This invention is intended to overcome the conventional problems explained in the above paragraphs. Namely, it is intended to provide an apparatus and a method for measuring a flow rate of a powder that uses capacitance, and that can stably measure the flow rate with a high accuracy even if the flow rate is low.

Means for Solving the Problems

To overcome the problems explained in the above paragraph, the inventors conceived this invention by improving the apparatuses for measuring the flow rate of a powder of Patent Documents 3 and 4.

The apparatus for measuring a flow rate of a powder of this invention, which apparatus uses capacitance, comprises:

a pipe ("a measuring pipe") for measuring a flow rate, through which a powder, together with air as a carrier gas, passes, an electrode ("a measuring electrode") for measuring changes of capacitance in the measuring pipe, which electrode is disposed around the measuring pipe, and a circuit ("a transducer") for transducing the capacitance as an output of the measuring electrode to a flow rate indicated by a display, wherein the measuring electrode and the transducer are hermetically housed in a casing and are fixed to the measuring pipe.

The apparatus for measuring a flow rate of a powder further comprises a sensor ("an atmospheric temperature sensor") for measuring the temperature of the atmosphere and a sensor ("a carrier-gas-temperature sensor") for measuring the temperature of the carrier gas. The carrier-gas-temperature sensor is disposed on the measuring pipe at a place that is not affected by the measuring electrode, and that is near the inner wall of the measuring pipe. The atmospheric temperature sensor is disposed so that it can measure the temperature of the atmosphere surrounding the apparatus for measuring a flow rate of a powder. The apparatus further comprises a circuit for compensating for the output of the measuring electrode based on the difference between the output of the atmospheric temperature sensor and that of the carrier-gas-temperature sensor.

For this invention, in the transducer, the flow rate of the powder can be output by compensating for the output of the measuring electrode based on the difference between the output of the atmospheric temperature sensor and that of the carrier-gas-temperature sensor. Thus, the true change of the flow rate of the powder can be measured with a high accuracy by only one measuring electrode.

For the constitution of this invention explained in the above paragraphs, it is preferable that the measuring pipe comprise a pipe ("a housing pipe") for housing a pair of measuring electrodes and a pipe ("a protecting pipe") for protecting the pair of measuring electrodes, wherein the protecting pipe is hermetically disposed in the housing pipe, and can be attached to and detached from the housing pipe. It is also preferable that the carrier-gas-temperature sensor be disposed on the outer surface of the protecting pipe by directly having the sensor contact the protecting pipe. The reason is that it is possible to measure the temperature of the carrier gas at a position that is as close as possible to the place where the carrier gas passes through the pipe.

The constitution of this invention explained in the above paragraphs also comprises:

a block ("a connecting block") for connecting wires, fixed to the protecting pipe, and a block ("a connected block") for being connected by wires, fixed to the housing pipe, and comprising wires connected to the transducer.

The wires of the connecting block and those of the connected block can quickly be connected and disconnected by means of pins and sockets disposed at the connecting and connected block, respectively. It is preferable that the carrier-gas-temperature sensor be installed in the connecting block. For maintaining the apparatus for measuring a flow rate of a powder, this configuration is advantageous because the wires of the connecting block and the connected block do not need to be connected or disconnected when the protecting pipe is replaced.

The method for measuring a flow rate of a powder of this invention comprises the following:

A method for measuring a flow rate of a powder by detecting changes of capacitance by means of a measuring electrode, which electrode is disposed around the measuring pipe, wherein the changes are caused by the flow rate of the powder passing through the measuring pipe together with a carrier gas, the method comprising:

a step for compensating for the output of the measuring electrode based on the difference between the output of the atmospheric temperature sensor and that of the carrier-gas-temperature sensor.

Effects of the Invention

For the apparatus for measuring a flow rate of a powder that uses capacitance, it is important for measuring the flow rate of the powder with high accuracy to detect any change of the temperature of a carrier gas (usually, air is used for a carrier gas) for carrying the powder, and to compensate for the measured capacitance, because the capacitance shifts based on the changes of the temperature of the atmosphere or the object to be measured.

For the present invention, by directly having a temperature sensor contact a protecting pipe (in which the powder passes through), which is the part that is the most sensitive to the temperature of the carrier gas, and by using a temperature sensor that is compact and that has a fast response, it is possible to compensate for the measured capacitance of the carrier gas with high accuracy, when the relationship between the temperature and the capacitance of the carrier gas is linear.

Namely, the apparatus for measuring a flow rate of a powder of this invention, which uses capacitance, can measure the flow rate of powder with high accuracy by means of an apparatus with a simple structure, without the measurement of the flow rate being affected by the condition of the environment, even if the flow rate is low.

Further, even if the temperature of the carrier gas that flows into the measuring pipe decreases, it is possible to measure the flow rate of the powder with high accuracy.

BRIEF DESCRIPTIONS OF THE DRAWINGS

FIGS. 2 (A) and (B) are schematic views showing the relationship between the ratio of the width of the detecting electrode to the width of the grounding electrode, and the electrical flux lines that are generated.

PREFERRED EMBODIMENT OF THE INVENTION

Below, a preferred embodiment of the invention is explained in detail.

Figure 1:
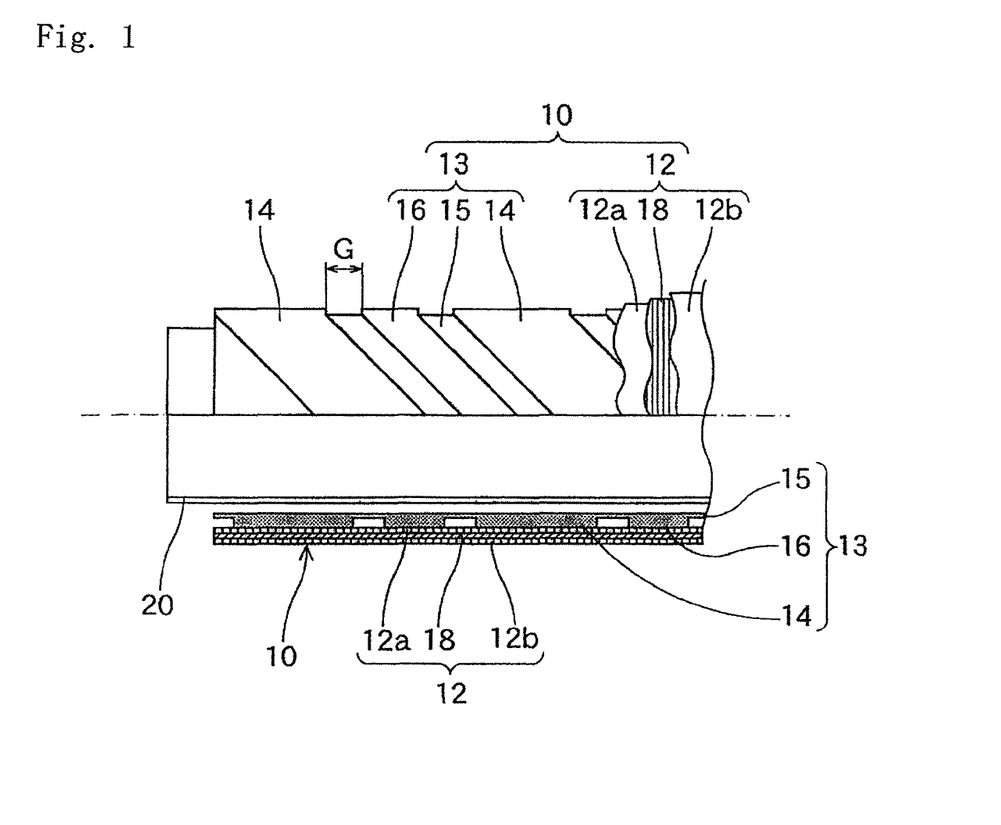
FIG. 1 shows a sectional view of an embodiment of a structure of a measuring portion. This embodiment is used with the apparatus for measuring the flow rate of a powder of this invention.

FIG. 1 shows an embodiment of a structure of a measuring portion, which comprises a housing pipe 10 and a protecting pipe 20, of the apparatus for measuring a flow rate of a powder of this invention.

The housing pipe 10 comprises a main layer 12, which acts as a formed insulator, and a flexible base layer 13 disposed at the inner surface of the main layer 12. These layers are integrally formed.

The main layer 12 is disposed on the flexible base layer 13. The layer 13 has a cylindrical shape and is made as follows: glass cloths are wound around the flexible base layer 13 and impregnated from its outer surface with an epoxy resin. Then the epoxy resin is cured. Further, a guard electrode 18, which is a single layer, covers the layer of the glass cloths/epoxy resin. For the main layer 12 shown in FIG. 1, the glass cloths are also wound around the guard electrode 18 and impregnated from its outer surface with an epoxy resin. Then the epoxy resin is cured. Thus, the main layer 12 comprises three layers, 12a, 18, 12b (in sequence from the inner side of the main layer 12). However, the constitution of the main layer 12 is not limited to this configuration.

The flexible base layer 13 comprises a film 15 made from a resin that acts as an insulator, a detecting electrode (a sensing electrode) 14 having a greater width, and a grounding electrode (an earth electrode) 16 having a lesser width, wherein the detecting electrode 14 and the grounding electrode 16 are printed on a surface of the film 15 (which surface corresponds to the outer side of the film 15 when it is wound and forms a cylinder) so that the detecting electrode 14 and the grounding electrode 16 form a striped pattern with an interval G between them.

The flexible base layer 13 is wound so that the detecting electrode 14 and the grounding electrode 16 form a spiral pattern with an interval G between them, and together form a cylinder. The sectional view perpendicular to the centerline of the housing pipe 10 shows that the detecting electrode 14 and the grounding electrode 16 are opposite each other.

The ratio of the width of the detecting electrode 14 to the width of the grounding electrode 16 is set to be within this range:

The ratio of [the width of the detecting electrode]/[the width of the grounding electrode]=1/1~3.5/1

Figure 2:
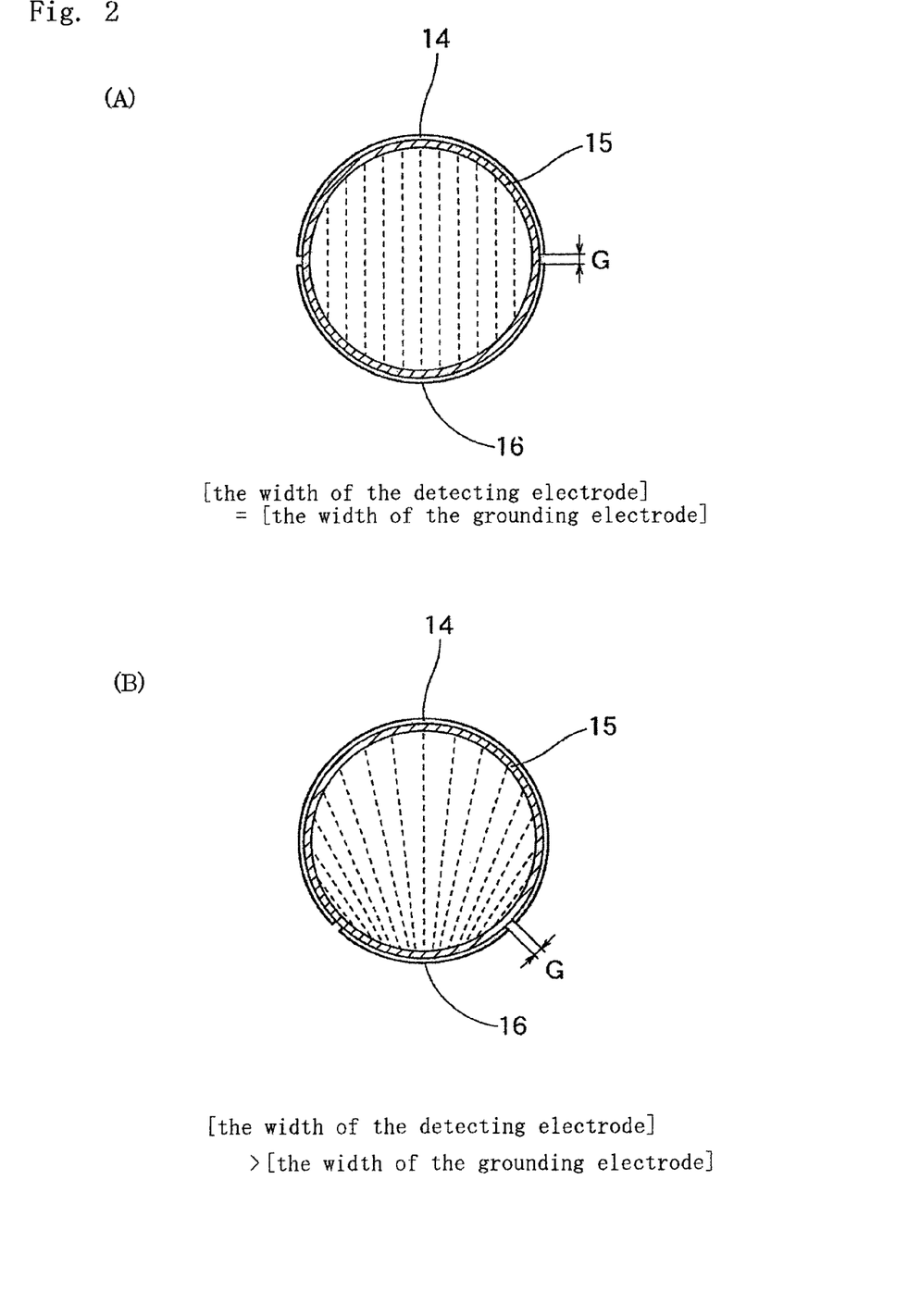

FIG. 2 shows electrical flux lines (A) when the width of the detecting electrode equals the width of the grounding electrode, and (B) when the width of the detecting electrode is greater than the width of the grounding electrode. Namely, when the ratio of [the width of the detecting electrode]/[the width of the grounding electrode]=1/1, the electrical flux lines become parallel. Then, the density of the electrical flux lines (sensitivity for measurement) at the center of the housing pipe becomes equal to that near the inner wall of the housing pipe. In contrast, when the width of the detecting electrode differs from the width of the grounding electrode, the electrical flux lines do not become parallel. Then, the density of the electrical flux lines (sensitivity for measurement) near the inner wall of the housing pipe becomes greater than that at the center of the housing pipe. Consequently, the sensitivity for measurement near the inner wall of the housing pipe increases.

As explained in the above paragraph, when the sensitivity near the inner wall of the housing pipe increases, it become possible to measure a flow rate of a powder without decreasing the accuracy of the measurement, even if, as explained below, the flow rate of the powder flowing through a protecting pipe, which is disposed inside of the housing pipe, is low. The reason is presumed to be the following: Namely, when the amount of the powder flowing in the protecting pipe is small, it is presumed that the powder flows spirally along the inner wall of the protecting pipe (this is new knowledge obtained by the inventors).

However, when the ratio of [the width of the detecting electrode]/[the width of the grounding electrode] becomes too great, it was found that the sensitivity of the measurement decreased. Because the area having a high density of the electrical flux lines becomes too narrow, and because the flow of the powder, which flows spirally flows along the inner wall of the protecting pipe, pulsates, the respective layers having a high and low density of powder are formed in the protecting pipe, it becomes difficult to precisely detect the changes of the flow rate of the powder.

When the flow rate of the powder is low, when the powder flows spirally along the inner wall of the protecting pipe, and when the ratio is set so that the width of the detecting electrode 14 differs from that of the grounding electrode 16, it is preferable to set the ratio of the width of the detecting electrode and the width of the grounding electrode from 1.2/1 to 3.5/1. It is further preferable to set it from 1.5/1 to 3.0/1. The preferable value of the ratio relies on the flow rate of the powder and the kind of powder. It is preferable that the interval G between the detecting electrode 14 and the grounding electrode 16 be from 0.5 to 5 mm, and further be from 1 to 3 mm. The preferable value of the interval G relies on the width of the detecting and the grounding electrode. For example, when the inner diameter of the housing pipe is 10.5 mm, it is preferable that the width of the detecting electrode be from 14 to 15.5 mm, and that the width of the grounding electrode be from 5.5 to 7 mm.

The housing pipe 10 comprises a base layer 12 and a flexible substrate 13. The protecting pipe 20, within which powder passes through, is disposed in the housing pipe 10. As explained below in detail, the protecting pipe 20 can be hermetically attached to and detached from the piping system by means of a connecting pipe 22.

The same material as that of an electrode tube, such as a silica glass, may be used for the material of the protecting pipe 20. However, usually oxide ceramics, which are insulating materials and irrefrangible, and that have excellent wear resistant characteristics, may be used, even though, as in the present case, the protecting pipe 20 is thin. Alumina and zirconia are examples of the oxide ceramics.

Usually, materials having excellent wear resistant characteristics may be used for the material of the protecting pipe. It is preferable that the protecting pipe 20 be exchangeable and that it be as thin as possible. For example, if the protecting pipe 20 is made from oxide ceramics, it is preferable that the protecting pipe be less than 0.7 mm thick, and more preferable that it be from 0.3 to 0.6 mm, and more preferable that it be from 0.4 to 0.5 mm. If the thickness of the protecting pipe 20 becomes less than these values, its use is shortened. In contrast, if the thickness of the protecting pipe 20 is greater than these values, the accuracy of the measurement of the flow rate of the powder decreases.

The structure of the measuring portion is not limited to one that comprises the housing pipe 10 having the detecting electrode and the grounding electrode and the protecting pipe 20, which conveys a powder (in which a powder passes through). Namely, without using the protecting pipe, the structure of the measuring portion may be comprised of just the housing pipe that is constituted of a silica glass tube with a detecting and a grounding electrode printed on its surface, and in which an object to be measured (a powder) directly passes through it. The structure of the housing pipe, which has the detecting and the grounding electrode, is also not limited to the embodiment explained in the above paragraphs. Namely, a housing pipe that has the detecting and the grounding electrode disposed on its inner surface, or a housing structure that has the detecting and the grounding electrode disposed on parallel plane plates, may be used.

Figure 3:
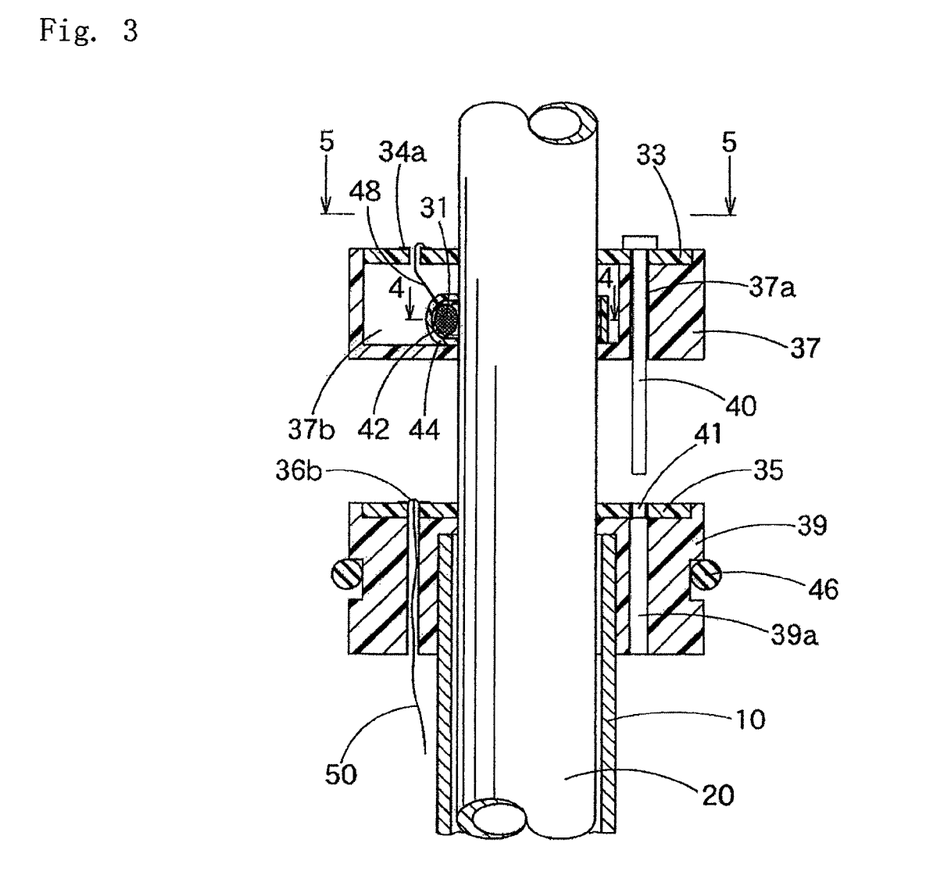
FIG. 3 shows a sectional view of the main part of the apparatus for measuring a flow rate of a powder before installing a carrier-gas-temperature sensor at the predetermined position.
Figure 4:
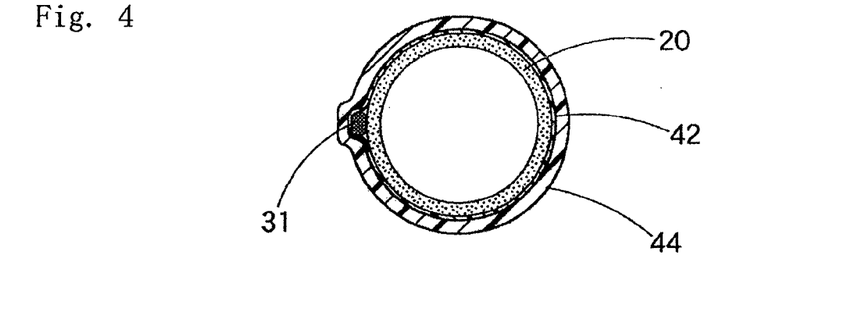
FIG. 4 shows a sectional view at line 4-4 of FIG. 3.
Figure 5:
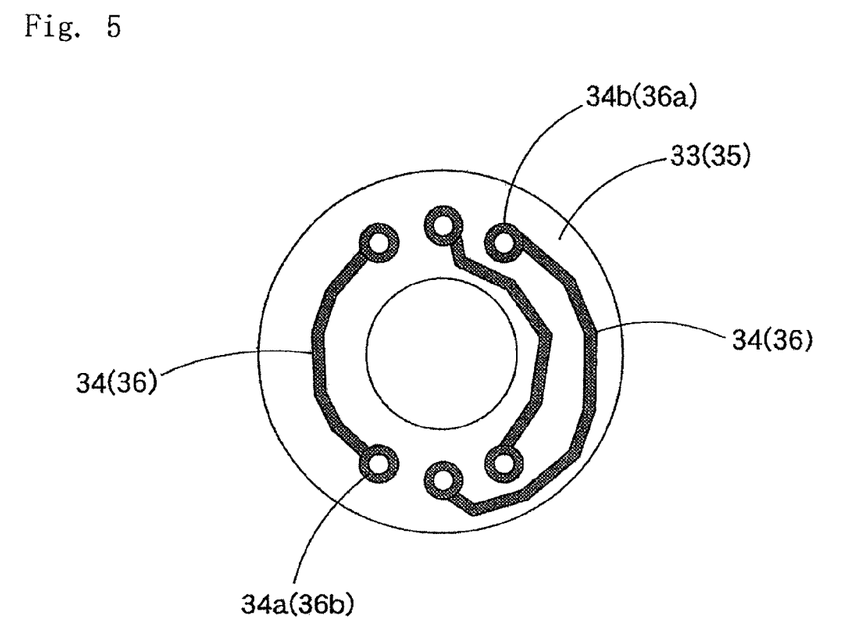
FIG. 5 shows a view from line 5-5 of FIG. 3, which view corresponds to a plane view of a printed wiring board.
Figure 6:
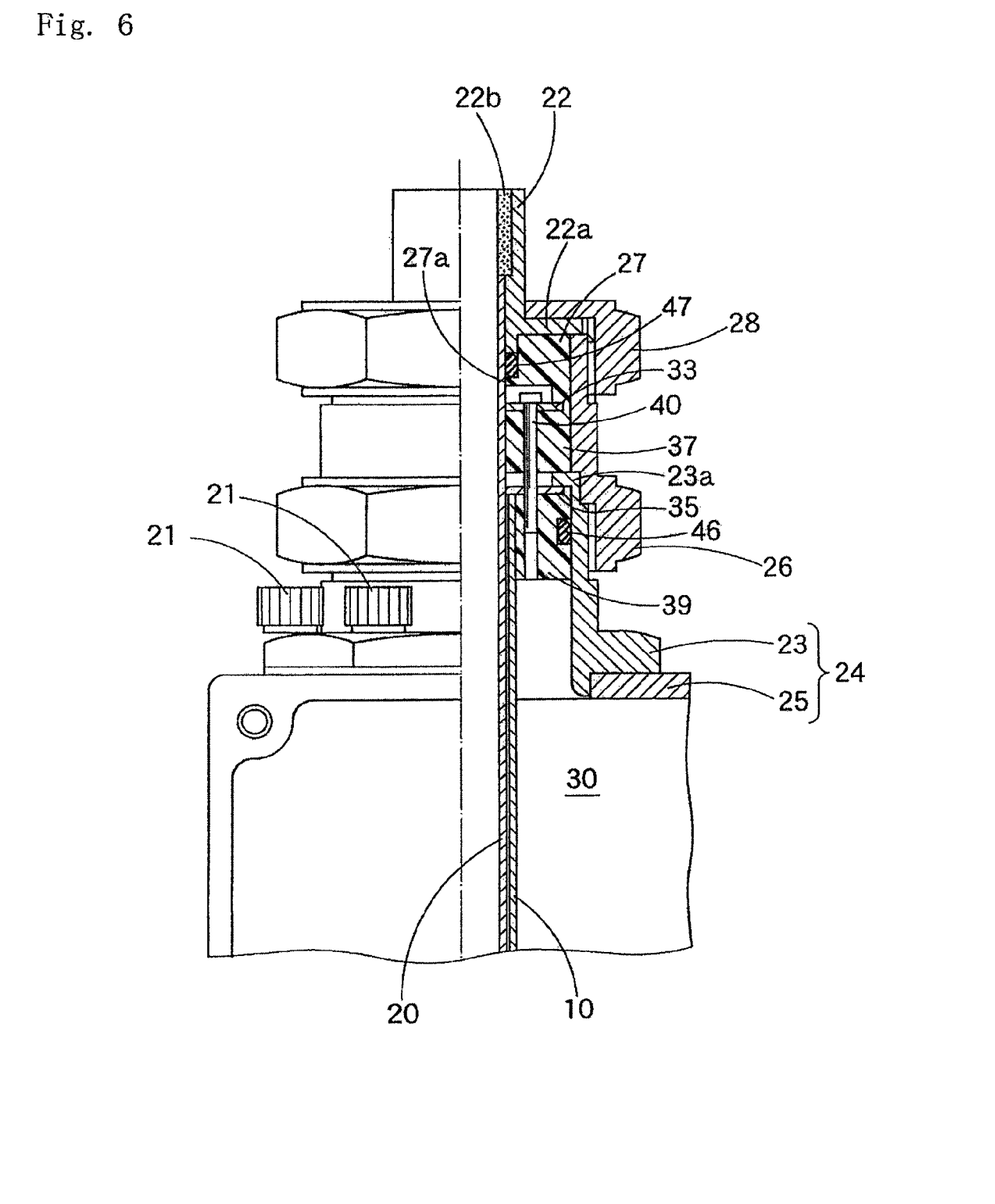
FIG. 6 shows a partial sectional view near the position where the carrier-gas-temperature sensor is installed, of an embodiment of the apparatus for measuring a flow rate of a powder of this invention.
Figure 7:
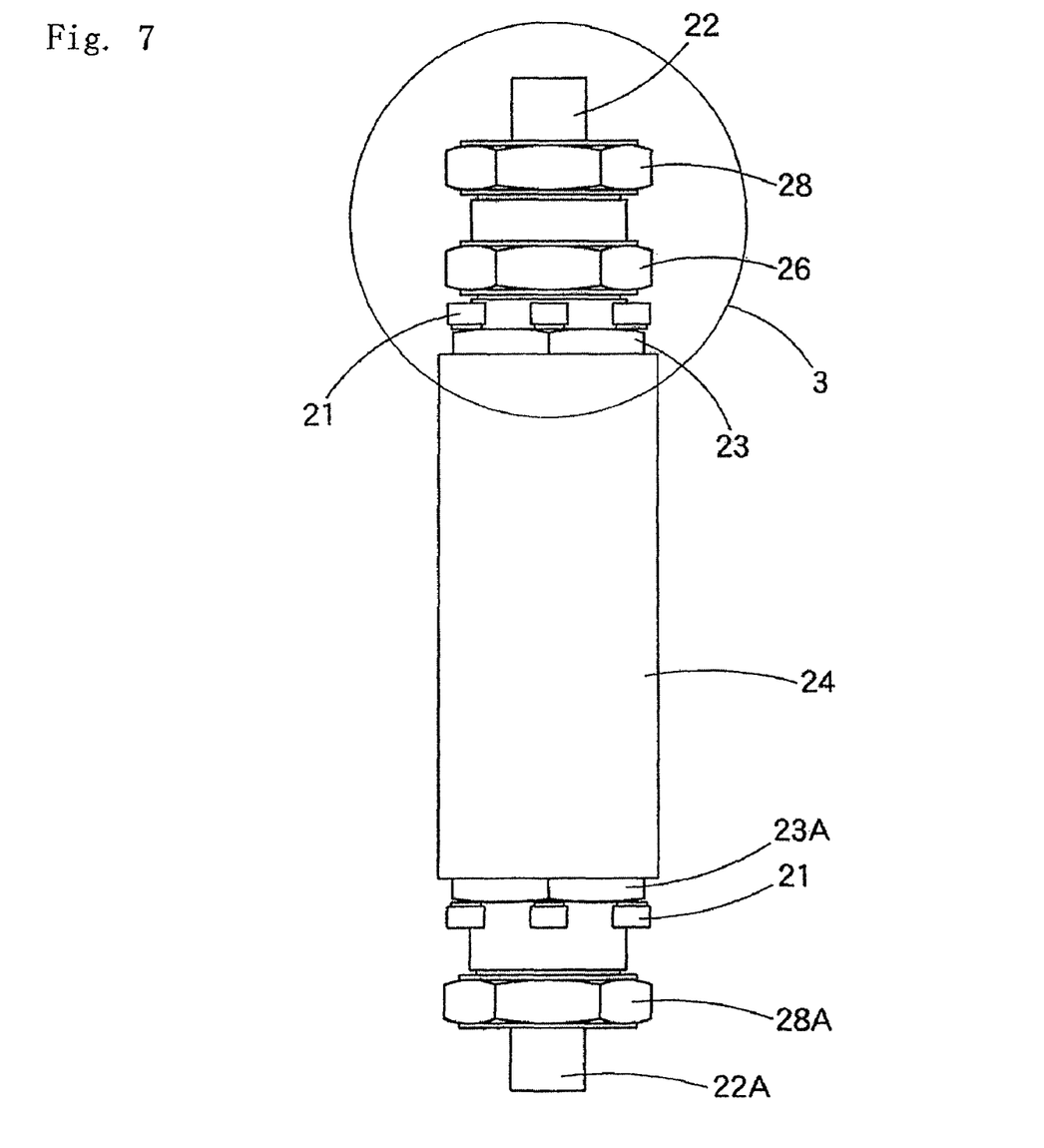
FIG. 7 is an entire elevational view of the apparatus of measuring a flow rate of a powder of this invention.

Based on FIGS. 3-7, below the characterizing portions of this embodiment are explained. FIGS. 3, 6, and 7 show an elevation view of an assembly of an apparatus for measuring a flow rate of a powder.

The carrier-gas-temperature sensor 31 is disposed at the outer surface and at the side of the entrance, in which entrance the powder to be measured flows, of the protecting pipe 20, and at the portion that is not covered by the housing pipe 10. Namely, the carrier-gas-temperature sensor 31 is disposed at the portion that is not affected by the detecting and the grounding electrodes 14, 16. The structure for fixing the carrier-gas-temperature sensor 31 to the protecting pipe 20 is not limited to a specific embodiment. It may be fixed to the protecting pipe 20 as follows: Namely, first the carrier-gas-temperature sensor 31 is clamped to the protecting pipe 20 by means of a belt-like film 42 ("a belt of thermal conductive film 42") having good heat conductance. Then, the belt of thermal conductive film 42 is wound around the protecting pipe 20. Next, the belt of thermal conductive film 42 is covered by a heat shrinkable tube 44, and then is fixed to the protecting pipe 20 by heating the heat shrinkable tube 44. In this paragraph, it is explained that the carrier-gas-temperature sensor 31 is disposed at the side of the entrance, in which entrance the powder to be measured flows, of the protecting pipe 20. However, the carrier-gas-temperature sensor 31 may be disposed at the side of the outlet, in which outlet the powder to be measured passes, of the protecting pipe 20.

It is preferable to use a thermistor-type temperature sensor for the carrier-gas-temperature sensor 31 of this embodiment, which sensor 31 is disposed on the outer surface of the protecting pipe 20. The reason is that the thermistor-type temperature sensor can respond extremely well to the change of the temperature of the protecting pipe 20, because of its high response speed, compared with other temperature sensors, such as a diode-type or a IC-type temperature sensor.

Although the thermal conductive film 42 may have good heat conductance, the type of film is not limited to a specific type. For example, a heat-dissipating silicone film can be used for the thermal conductive film 42. Although the heat shrinkable tube 44 may have sufficient heat shrinkable properties to hold the thermal conductive film 42 and the carrier-gas-temperature sensor 31, the tube 44 is not limited to a specific type. For example, a polyethylene tube (a PE tube) or a polyvinyl chloride tube (a PVC tube) can be used for the heat shrinkable tube 44.

When the protecting pipe 20, to which the carrier-gas-temperature sensor 31 is fixed, is inserted inside the housing pipe 10, it can be replaced by a simple operation. The carrier-gas-temperature sensor 31 can be connected to and disconnected from the terminals of the compensation circuit of the transducer 30 (see FIG. 6), which is disposed on the housing pipe 10.

Below, the structures and the functions of the connecting block 37 and the connected block 39 are explained. On the upper surfaces of the connecting block 37 and the connected block 39, an upper printed-wiring board 33 and a lower printed-wiring board 35, which are shown in FIG. 5, are mounted, respectively. An upper positioning hole 37a and a lower positioning hole 39a are disposed at the connecting block 37 and the connected block 39 respectively so that the location of the output terminal 34b of the wiring 34 of the upper printed-wiring board 33 can be placed so as to correspond to the location of the input terminal 36a of the wiring 36 of the lower printed-wiring board 35. A connecting pin 40 can be inserted into the upper positioning hole 37a and the lower positioning hole 39a, which pin 40 extends through the connecting block 37 and the connected block 39. (For the embodiment shown in FIG. 3, the connecting pin 40 is inserted from the side of the connecting block 37 to the side of the connected block 39.) Namely, the portion that forms a socket for the connecting pin 40 corresponds to the lower positioning hole 39a of the connected block 39. Since the connecting block 37 and the connected block 39 are fixed to the protecting pipe 20 and the housing pipe 10, respectively, by means of an adhesive, etc., the connecting block 37 and the connected block 39 also act as a block for positioning the protecting pipe 20 and the housing pipe 10. Further, an O-ring 46 can be installed at the periphery of the connected block 39. The connecting block 37 and the connected block 39 are constituted of an insulating material. Usually, they are made from a resinous material.

For this embodiment, a space 37b for housing a sensor is formed in the connecting block 37. After housing the carrier-gas-temperature sensor 31, the space 37b is closed by means of the upper printed wiring board 33. Then a first lead wire 48 of the carrier-gas-temperature sensor 31 is connected to the input terminal 34a of the wiring 34 disposed on the upper printed wiring board 33. Further, the output terminal 36b of the wiring 36 that is disposed on the upper printed wiring board 33 can be connected to the input terminal of the compensation circuit of the transducer 30 (see FIG. 6) through a second lead wire 50. The upper and the lower printed wiring boards 33, 35 have through holes and two surfaces where wiring is printed (not shown in the Figs.). This was determined based on a comparison of the reliability of a connection made by soldering and the reliability of a connection made by means of the pins. The connecting block 37 and the connected block 39 are fixed to the protecting pipe 20 and the housing pipe 10 by an adhesive, respectively.

A block for positioning the housing pipe, which has a structure similar to that of the connected block 39, is hermetically fixed to an outer cylindrical structure 23a for holding the housing pipe by means of an O-ring at the other side of the housing pipe 10 (the lower side in FIG. 7).

As shown in FIG. 6, a block 27 for fixing the protecting pipe is disposed above the connecting block 37, which is fixed to the protecting pipe 20. Further, a block for positioning the protecting pipe, which has a structure similar to that of the block 27 and is made from a resinous material, is hermetically disposed at the other side of the protecting pipe 20 (the lower side in FIG. 7) by means of an O-ring disposed at the inner surface of the block for positioning the housing pipe.

Below, for this embodiment, an example of a method for installing the measuring portion, which comprises a housing pipe 10 and a protecting pipe 20, to a casing 24, is explained. Here, FIG. 7 shows the entire assembly of the apparatus for measuring the flow rate of a powder. The boards (not shown) of the circuit of the transducer for transforming the signal of the voltages of the electrodes to the signal of the capacitance, and the circuit for compensating for the change of the temperature of the object to be measured, are installed in the casing 24.

The outer cylindrical structures 23, 23a, for holding the housing pipe, are substantially and hermetically fixed to respective sides of the casing 24 by means of screws 21, 21.

As shown in FIGS. 3 and 6, the connected block 39 is disposed at one side of the housing pipe 10. The block for positioning the housing pipe is disposed at the other side of the housing pipe 10. Since O-rings 46 are installed at the outer surfaces of the connected block 39 and the block for positioning the housing pipe, a hermetically closed space is formed between the outer cylindrical structures 23, 23a.

As explained above, the block 27 for fixing the protecting pipe is disposed at the side of the protecting pipe 20. Further, the block for positioning the protecting pipe is disposed at the other side of the protecting pipe 20. The block 27 for fixing the protecting pipe and the block for positioning the protecting pipe are threadably fixed to the outer cylindrical structures 23, 23a by means of an intermediate union nut 26 and distal union nuts 28, 28a. Thus, the housing pipe 10 and the protecting pipe 20 can be hermetically installed in the casing 24.

As explained in the above paragraphs, there is a structure for installing the measuring portion, which structure comprises the housing pipe 10 and the protecting pipe 20, to the casing 24. To do so, the protecting pipe 20 can be replaced by a simple operation. The following structure is used for this. Namely, by attaching the intermediate union nut 26 to the structure, the connecting block 37 can be installed between the connected block 39 and the block 27 for fixing the protecting pipe.

The outer cylindrical structures 23, for holding the housing pipe, is hermetically assembled to the main body 25 of the casing 24 by means of the screws 21, etc. The main body 25 of the casing 24 has a space that can house output terminals, such as the detecting electrode 14 and the grounding electrode 16, and the transducer 30 connected to the lead wire of the carrier-gas-temperature sensor 31, etc. (About the constitution of the circuit of the transducer 30, see FIG. 9.) By applying this constitution to the apparatus, the lead wire for connecting each electrode to the transducer 30 becomes unnecessary. Further, it can reduce the possibility that signals would be affected by noise. Here, the atmospheric temperature sensor is disposed on the transducer 30 (see FIG. 9). For the same reason as that explained above, it is preferable to install the atmospheric temperature sensor in the transducer 30. However, it may be installed outside the transducer 30.

The O-ring 46 is installed on the periphery of the connected block 39, which is fixed to the housing pipe 10. Since the O-ring 46 contacts the inner portion of the flange 23a, which is disposed at the distal end of the outer cylindrical structures 23, the hermetic sealing is maintained, and, further, the housing pipe 10 is positioned and held. The outer cylindrical structures 23, 23a are fixed to the casing 24 by the screws 21, 21. Then, the connecting block 37 is positioned and connected to the connected block 39, which is attached to the housing pipe 10, by means of the connecting pin 40. The connecting pin 40 acts to conduct electricity between the connecting block 37 and the connected block 39, which are arranged one above the other. Next, after the intermediate union nut 26 is fixed to the outer cylindrical structure 23 by its threads, the block 27, for fixing the protecting pipe that has the O-ring 47 disposed at its inner periphery, is inserted in the intermediate union nut 26. Then, the distal union nut 28 is fixed to the intermediate union nut 26 by its threads. This block 27 for fixing the protecting pipe has functions for fixing the connecting pipe 22 and for sealing the connecting pipe 22 to the protecting pipe 20.

The protecting pipe 20 is inserted in the housing pipe 10, and constitutes the structure of the measuring portion having a double-layered structure. The structure of the measuring portion is designed so that the clearance between the protecting pipe 20 and the housing pipe 10 becomes less than 0.6 mm. The clearance is adjusted by positioning the connected block 39, which is fixed to the housing pipe 10 by means of by an adhesive, in the inner portion of the flange 23a disposed at the distal end of the outer cylindrical structures 23.

The O-ring 47 is hermetically mounted between the shoulder 22a, disposed at the lower portion of the connecting pipe 22, and the shoulder 27a, formed at the inner side of the block 27 for fixing the protecting pipe.

A pipe 22b, which is made from oxide ceramics and that has the same inner diameter as that of the protecting pipe 20, is disposed at the inner side of the distal end of the connecting pipe 22 so that it forms a liner for the protecting pipe 20. The liner can improve the resistance to the abrasion of the connecting pipe 22 when powder passes through it.

When the powder passes through the protecting pipe 20, the change of the capacitance of the powder is converted to the change of a voltage or a current (usually, a voltage) by the transducer 30, which is installed in the casing 24. The outputs of the change of the voltage or the current are inputted to a display through a wire cable, which display has a function for scaling the data. They are converted to physical quantities corresponding to the flow rate of the powder and shown by the display.

For this embodiment, the atmospheric temperature sensor is installed on the substrate of the compensation circuit of the transducer 30. The reason for installing the sensor in the transducer 30 is that the sensor can follow the change of the atmospheric temperature even though the sensor is installed in the transducer 30, because any change of the atmospheric temperature is gradual.

Figure 8:
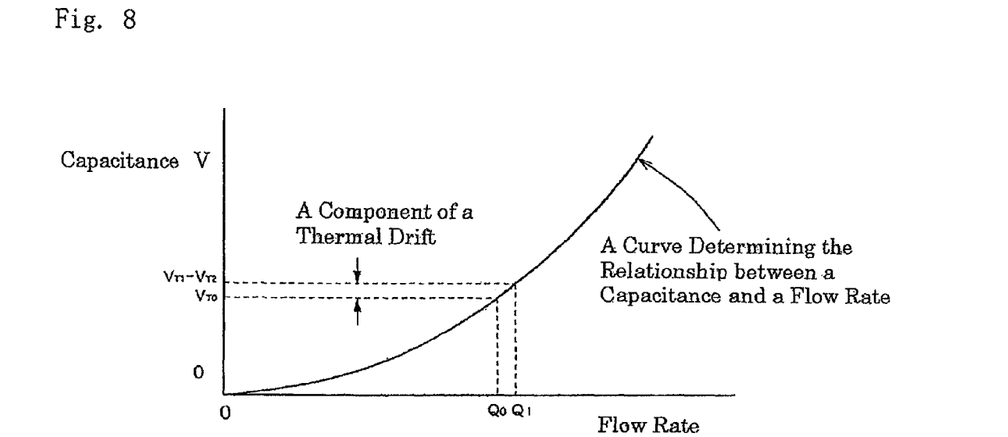
FIG. 8 is a graph showing a curve determining the relationship between a capacitance and a flow rate, which graph is used for this invention.
Figure 9:
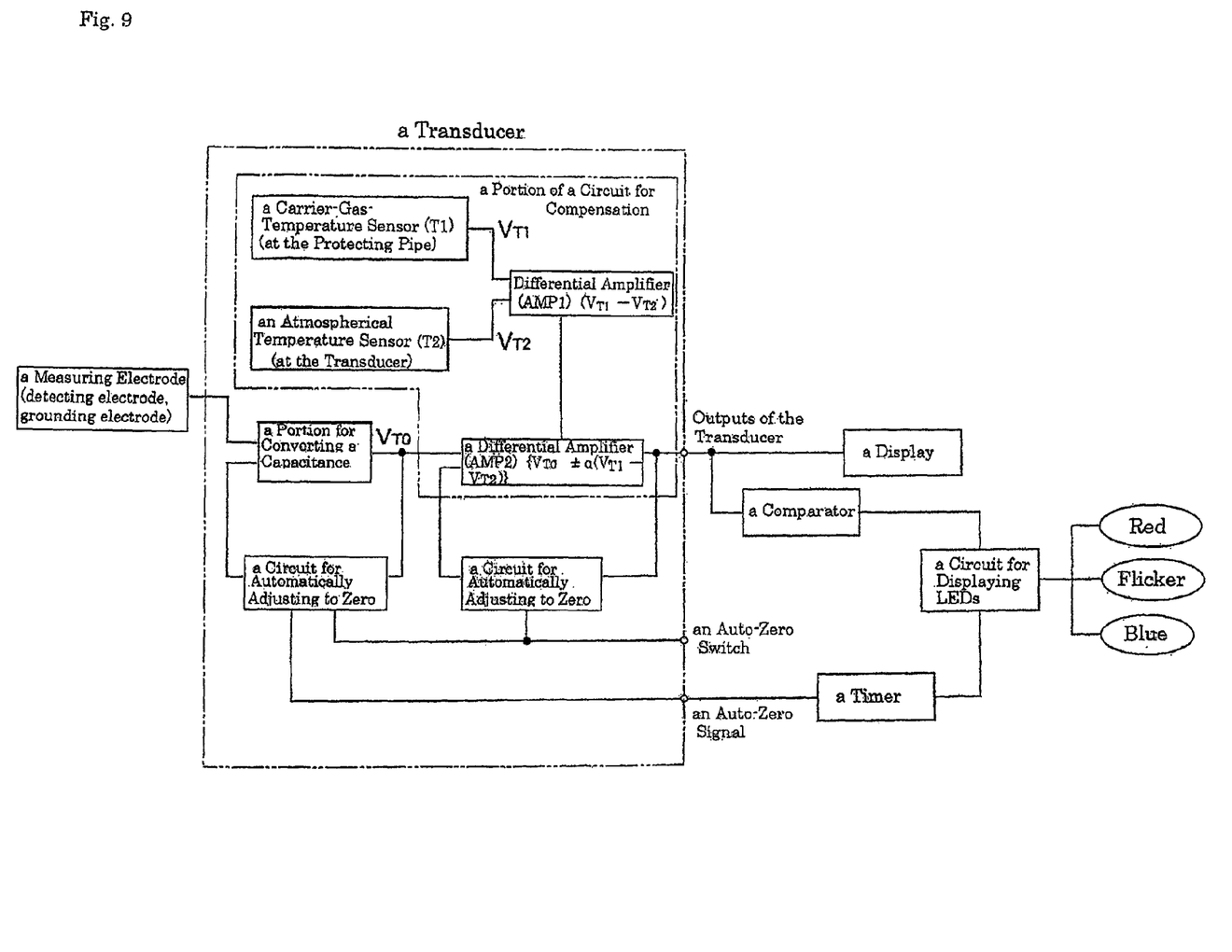
FIG. 9 shows a block diagram of a circuit of the transducer. It includes a circuit for thermal compensation.
Figure 10:
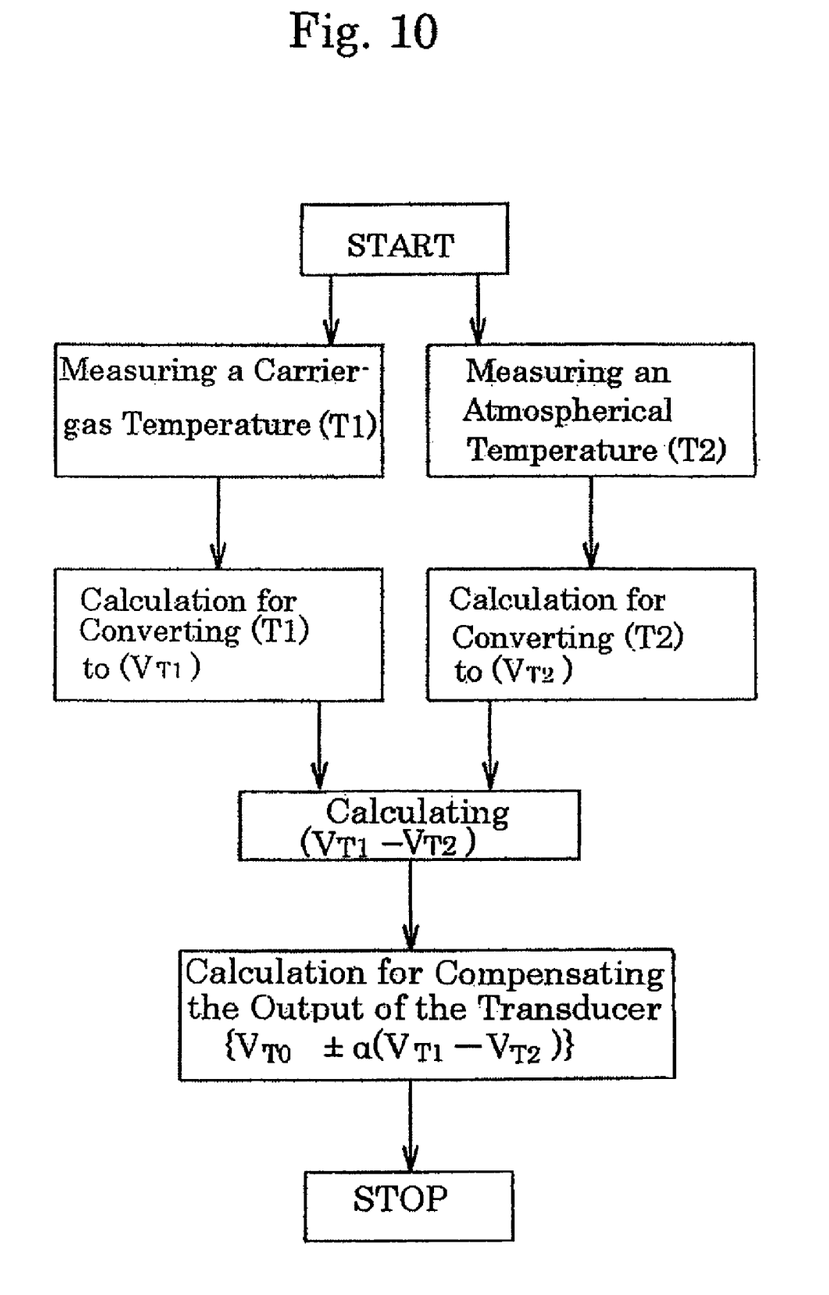
FIG. 10 is a flowchart showing a method of thermal compensation for measuring the flow rate of this invention.

Next, below a method for measuring a capacitance of the powder of this embodiment is explained. FIG. 8 is a graph showing a curve determining the relationship between a capacitance and a flow rate. FIG. 9 is an example of a schematic block diagram of the compensation circuit used for this embodiment. FIG. 10 is a flowchart showing a method of thermal compensation for measuring the flow rate, of this invention.

1. Making a Graph Showing a Curve that Determines the Relationship between a Capacitance and a Flow Rate The allowable range of the atmospheric temperature of the apparatus for measuring a flow rate of a powder of this invention is 5~45° C. Within the range of the atmospheric temperature, after adjusting the output of the measuring electrode to "0" (automatically adjusting to zero), the output of the measuring electrode is measured when the flow rate of the powder equals "0" (then, the output becomes substantially "0"; see Tables 3 and 4). Next, the graph is made in such a way that the values of the capacitances are converted to a voltage, and the values corresponding to each flow rate are plotted on the graph while step by step the flow rate of the same powder as that to be measured is increased. When the apparatus for measuring a flow rate of a powder is used within 5~45° C. of the atmospheric temperature, the curves of the graph, which curves determine the relationship between a capacitance and a flow rate, become substantially the same shape, by adjusting to "0" the values of capacitances when the flow rate of the powder is "0." In this regard, the graph showing a curve determines the relationship between a capacitance and a flow rate. A graph must be made of each type of powder, because if a powder to be measured differs, the curve of the graph will differ.

2. Determination of the Coefficient of Thermal Compensation

The measurements of the capacitance are converted to the flow rate of the powder based on the graph showing a curve that determines the relationship between a capacitance and a flow rate. Then the flow rate of the powder is shown by the display. However, the outputs of the transducer 30 include a component of a thermal drift caused by the change of the temperature of the carrier gas that passes through the protecting pipe. Thus, it is necessary to determine the coefficient of the thermal compensation for compensating for the component of the thermal drift.

To clarify what degree of the change of the capacitance is caused by the change of the temperature of the carrier gas, the following test was performed.

The apparatus for measuring the flow rate of a powder of this embodiment was placed in a constant-temperature oven. The temperature of the constant-temperature oven was controlled so that its temperature step-wise increased (or decreased) at predetermined time intervals. Then, the capacitances were measured when the protecting pipe was equipped with the apparatus and when the protecting pipe was not equipped with the apparatus.

The coefficient of thermal compensation is indirectly determined by subtracting the coefficient of the thermal drift when the protecting pipe is not equipped with the apparatus from the coefficient of the thermal drift when the protecting pipe is equipped with the apparatus. Where the coefficient of the thermal drift is defined as the amount of the change of the output voltage of the measuring electrode or defined as the amount of the change of the capacitances, which are converted, then the temperature of the carrier gas (the temperature of the air existing at the inner side of the housing pipe) is changed by 1° C.

For example, from the measurements of tests 1 and 2 explained below, the coefficient of the thermal compensation can be determined as follows.

From the measurements of tests 1 and 2, the coefficient of the thermal drift when the protecting pipe is equipped with the apparatus is "0.14905 V/° C.," where the coefficient of the thermal drift is determined by averaging the value of the coefficient when the temperature of the carrier gas increases and that when the temperature of the carrier gas decreases.

Since the sensitivity of the transducer is 1 pF/full scale (10 V), and its gain is 11 times, then the protecting pipe is equipped with the apparatus the coefficient of the thermal drift that is converted to a capacitance is 0.00135 pF/° C.

Similarly, the coefficient of the thermal drift when the protecting pipe is not equipped with the apparatus is "0.1172 V/° C.," where the coefficient of the thermal drift is determined by averaging the value of the coefficient when the temperature of the carrier gas increases and that when the temperature of the carrier gas decreases.

Since the sensitivity of the transducer is 0.1 pF/full scale (10 V), and its gain is 4 times, then the protecting pipe is not equipped with the apparatus the coefficient of the thermal drift that is converted to a capacitance is 0.000293 pF/° C.

Thus, the coefficient of the thermal drift of the protecting pipe that is converted to a capacitance is:

$$0.00135 \text{ pF/° C.} - 0.000293 \text{ pF/° C.} = 0.001057 \text{ pF/° C.}$$

Since the sensitivity of the transducer is 0.1 pF/full scale (10 V), the coefficient of the thermal drift of the protecting pipe that is converted to a voltage is 0.1057 V/° C.

Assuming that the sensitivity of the compensation circuit of the transducer is 0.1 pF/full scale (10 V), and its gain is 3 times, then the coefficient of thermal compensation ($\alpha$) is:

$$\alpha = 3 \times 0.1057 = 3.171$$

3. Calculation of Thermal Compensation

Based on the method shown in FIG. 10, the calculation of the thermal compensation is performed in the transducer having the compensation circuit shown in FIG. 9. Then, the result of the thermal compensation is output from the transducer.

In the transducer, the differential amplifier AMP1 calculates a difference in the output ($V_{T1} - V_{T2}$) based on the output ($V_{T1}$) of the carrier-gas-temperature sensor T1 and the output ($V_{T2}$) of the atmospheric temperature sensor T2.

Based on the voltage ($V_{T0}$), which is the output of the measuring electrode that is converted by the portion for converting the capacitance, by the output ($V_{T1} - V_{T2}$) of the differential amplifier AMP1, and by the coefficient of thermal compensation ($\alpha$), the differential amplifier AMP2 calculates the compensated-for measurements by using this equation:

$$V_{T0} \pm \alpha(V_{T1} - V_{T2})$$

Then the differential amplifier AMP2 outputs the compensated-for measurements, which are the output of the transducer, on the display.

The comparator can detect whether the output of the transducer is within ±50 mV, and then it outputs the result to the displaying circuit using LEDs. When the output of the transducer is within ±150 mV, the blue LED turns on. When the output of the transducer is over ±50 mV, the red LED turns on.

When the output of the transducer is over ±150 mV, it means that when the flow rate of the powder is zero, the output of the transducer cannot be near zero, because of the change of the atmospheric temperature caused by the change of the seasons. Namely, it means that it is necessary to adjust the output of the measuring electrode to zero (automatically adjusting to zero). By a switch for automatically adjusting the output of the measuring electrode to zero (Auto-Zero Switch), the output of the measuring electrode can be adjusted to zero. While adjusting the output of the measuring electrode to zero, the red LED, for "Flicker" turns on. Even though the operation for adjusting the output of the measuring electrode to zero is completed, some time delay for displaying "0" on the display is caused, because the output from the transducer is averaged. Thus, for the time corresponding to the time delay, the display can indicate the data without any flicker being shown by controlling the time delay by a timer.

The apparatus for measuring a flow rate of a powder can be applied to an apparatus for handling a powder. The apparatus is not limited to a specific apparatus. For example, it can be installed in a suction-type air-blasting machine shown by FIG. 11, and used.

Figure 11:
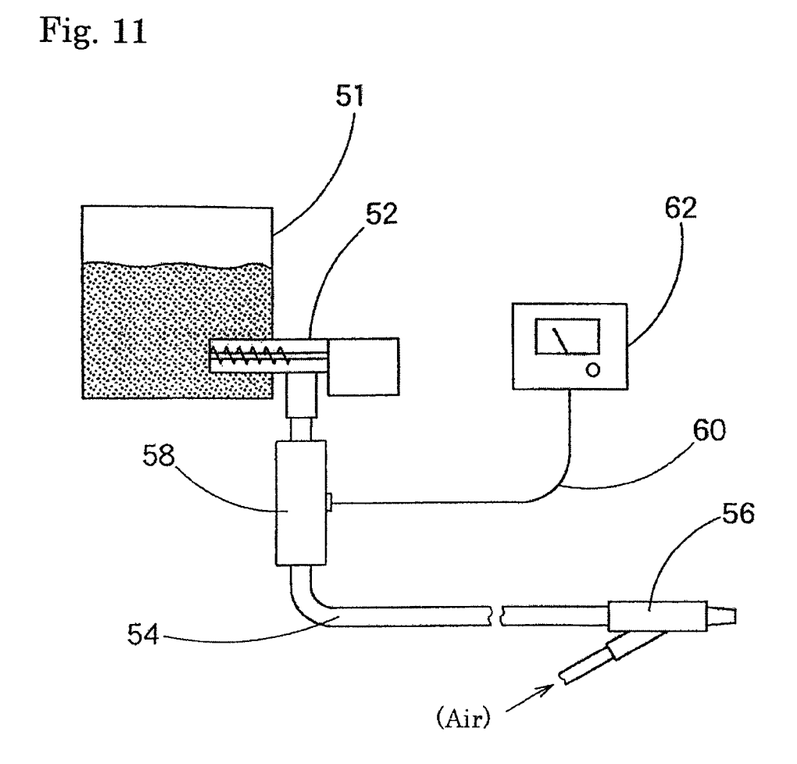
FIG. 11 shows an example of an application of this invention. The example is a suction-type air-blasting machine that includes the apparatus of this invention for measuring a flow rate of a powder.

The suction-type air-blasting machine takes a given amount of a powder (a blasting material) out of the tank 51 for storing the powder by means of a screw feeder 52. Then, it projects the powder by means of an ejector 56 through a pressure-proof hose 54 (outer diameter: 30 mm; thickness: 5.5 mm). The apparatus 58 for measuring a flow rate of a powder is assembled between the port for discharging the powder of the screw feeder 52 and the proximal end of the pressure-proof hose 54.

Vacuum pressure of about −3000 mmAq (−29 KPa) of vacuum pressure and about 25 m/sec of velocity, the powder is suctioned in and passed through the apparatus 58. Then, the capacitance of the powder is measured and converted to a voltage, and is output through a coaxial cable 60 and a display for converting and displaying the data.

Next, while changing the flow rate of the powder (changing the amount of the powder taken out of the tank 51), the change of the voltage (the change of the capacitance) is measured. By determining the relationship between the flow rate of the powder and the output of the voltage based on the measured data, the flow rate of the powder can be measured.

EXAMPLES

Below, examples (tests) for verifying the effects of this invention are explained.

In the examples, the apparatus for measuring a flow rate of a powder that has the specifications shown by Table 1 is used, where the ratio of [the width of the detecting electrode 14]:[the width of the grounding electrode 16] is 3:1, and where the housing pipe 10 having the structure of the electrode that is a core-less type and is disposed with a spiral pattern is used for the apparatus (see FIG. 1). By using these elements, the apparatus for measuring a flow rate of a powder that uses capacitance, which apparatus can compensate for the thermal drift, is assembled.

The circuit of thermal compensation shown in FIG. 9, which circuit can compensate for the thermal drift based on the flowchart of FIG. 10, and which circuit acts as the compensation circuit for the transducer, is used in the apparatus.

TABLE 1

| | | EXAMPLE |
|---|---|---|
| Material of an Electrode | | Printed Copper |
| Material of the Main Layer of a Housing Pipe | | Glass Cloth and Reinforced Epoxy Resin |
| A Protecting Pipe | Material | 92% Alumina |
| | Thickness | 0.5 mm |
| | Outer Diameter | 10 mm |
| | Gap between the Protecting Pipe and the Housing Pipe | 0.25 mm |
| Material of the Guard Electrode | | Copper Foil |

Test 1

Figure 12:
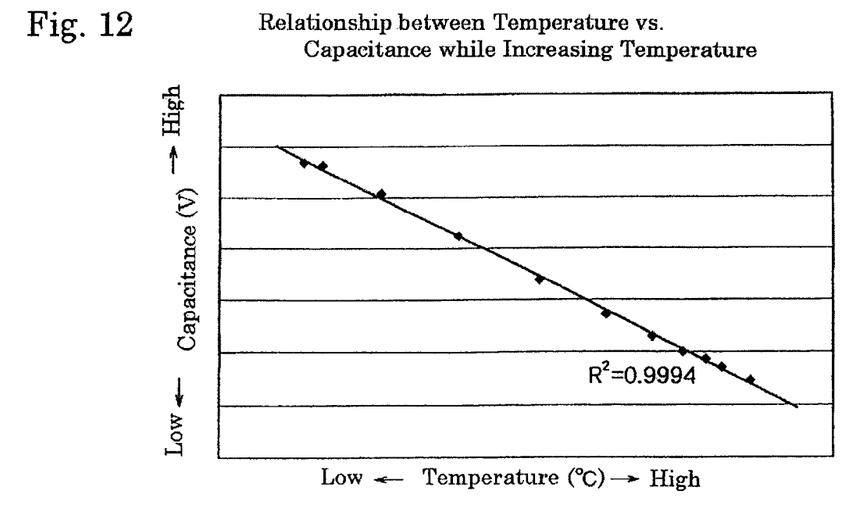
FIG. 12 shows a graph of the results of the measurements of the outputs of the temperature sensors and the change of the capacitance in the electrode while step-wise increasing the temperature of a measuring constant-temperature oven from 10 to 40° C., after placing the apparatus for measuring a flow rate of a powder of this invention in the oven.

The sensitivity and the gain of the transducer were set to 1 pF/full scale (10 V) and 11 times, respectively. After placing the apparatus for measuring a flow rate of a powder in a constant-temperature oven that was kept at 10° C., the outputs of the temperature sensors and the change of the capacitance in the electrode were measured. Further, while step-wise increasing the temperature of the oven up to 40° C., the capacitance in the electrode was measured at each change in temperature. FIG. 12 shows the data on the measurement. From FIG. 12, it is understood that the capacitance is in inverse proportion to the temperature.

Test 2

Figure 13:
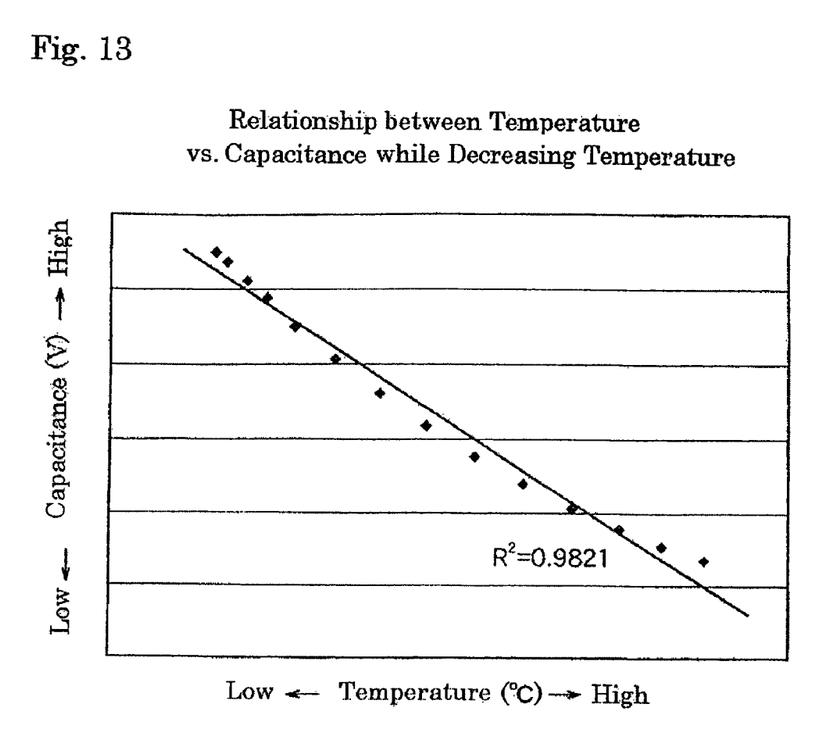
FIG. 13 shows a graph of the result of the measurement of the outputs of the temperature sensors and the change of the capacitance in the electrode while step-wise decreasing the temperature of the constant-temperature oven from 40 to 10° C.

The apparatus for measuring a flow rate of a powder that uses capacitance and that was used for Test 1 was placed in the same oven as that used for Test 1. While step-wise decreasing the temperature of the oven from 40° C. to 10° C., the capacitance in the electrode was measured at each change in temperature. FIG. 13 shows the data on the measurement. From FIG. 13, as well as Test 1, it is understood that the capacitance is in inverse proportion to the temperature. In FIGS. 12 and 13, $R^2$ denotes any variance.

Test 3

The apparatus for measuring the flow rate of a powder that uses capacitance and that was used for Test 1 was also used for Test 3. The sensitivity and the gain of the transducer were set to 1 pF/full scale (10 V) and 40 times, respectively. Vacuum pressure of about −2500 mmAq, velocity of about 24 m/sec, and room temperature of 21° C., suctioned air (a carrier gas) was passed through the protecting pipe 20 for a minute (at 90 liters/minute of a flow rate), and then the output of the transducer was measured. Table 2 shows the result of the measurements. From Table 2, since the thermal compensation was carried out, it is understood that no change of the measurement of the output of the transducer occurred.

TABLE 2

| | Output Voltage (V) | Capacitance (pF) |
|---|---|---|
| Static Condition | 0.001 | $2.5 \times 10^{-6}$ |
| Point of Start (1) | 0.002 | $5.0 \times 10^{-6}$ |
| Point of End (2) | 0.002 | $5.0 \times 10^{-6}$ |

Note:
(1) "Point of Start" means just after the carrier gas begins to flow.
(2) "Point of End" means just before the carrier gas stops flowing.

Test 4

The apparatus for measuring a flow rate of a powder that uses capacitance and that was used for Test 1 was used for Test 4. The sensitivity and the gain of the transducer were set to the same conditions as those of Test 3. Under the same conditions of vacuum pressure and velocity as those of Test 3, Green-Carborundum GC#600 was intermittently taken out of the tank at 38, 76, 151, 230, and 303 grams/minute (g/min) for one minute. It flowed into the apparatus for measuring a flow rate of a powder together with air at 21° C. Then, the outputs of the apparatus for measuring a flow rate of a powder were measured. While the powder was stopped from flowing, the air was caused to continue to flow through the apparatus. Table 3 shows the result of the measurements. From Table 3, it is understood that the output of the apparatus, when only the air flows through it, which output was compensated for based on the measurement of the temperature sensor, was the same as that that occurs during the static condition.

TABLE 3

| Flow Rate of the Powder (g/min.) | Output Voltage (V) | Capacitance (pF) |
|---|---|---|
| 0 | 0.001 | $2.5 \times 10^{-6}$ |
| 38 | 0.226 | $5.65 \times 10^{-4}$ |
| 0 | 0.002 | $5.0 \times 10^{-6}$ |
| 76 | 0.598 | $1.495 \times 10^{-3}$ |

TABLE 3-continued

| Flow Rate of the Powder (g/min.) | Output Voltage (V) | Capacitance (pF) |
|---|---|---|
| 0 | 0.002 | $5.0 \times 10^{-6}$ |
| 151 | 1.943 | $4.858 \times 10^{-3}$ |
| 0 | 0.001 | $2.5 \times 10^{-6}$ |
| 230 | 4.576 | $1.114 \times 10^{-2}$ |
| 0 | 0.003 | $7.5 \times 10^{-6}$ |
| 303 | 7.263 | $1.816 \times 10^{-2}$ |
| 0 | 0.002 | $5.0 \times 10^{-6}$ |

Comparative Test 5

A comparison of the apparatus for measuring a flow rate of a powder that uses capacitance and that was used for Tests 1~4, Comparative was carried out in Test 5, which was similar to Test 3, was carried out by using the apparatus that had no temperature data for the thermal compensation. Table 4 shows the result of the measurements. From Table 4, it is recognized that when only the air begins to flow through the apparatus in the static condition does the output of the apparatus become plus, and only when the air is stopped from flowing through the apparatus does it become minus. The reason is that the temperature inside the protecting pipe 20 is reduced a little when the air flows into the protecting pipe. The result of Comparative Test 5 corresponds to the result of Test 1.

TABLE 4

| | Output Voltage (V) | Capacitance (pF) |
|---|---|---|
| Static Condition | 0.0024 | $6.0 \times 10^{-6}$ |
| Point of Start (1) | 0.0903 | $2.258 \times 10^{-4}$ |
| Point of End (2) | −0.0991 | $-2.478 \times 10^{-4}$ |

Note:
(1) "Point of Start" means just after the carrier gas begins to flow.
(2) "Point of End" means just before the carrier gas stops flowing.

What we claim is:

1. An apparatus that uses capacitance for measuring a flow rate of a powder and that comprises:
    a measuring pipe, through which a powder together with a carrier gas pass, for measuring a flow rate,
    a measuring electrode for measuring changes of capacitance in the measuring pipe, which electrode is disposed around the measuring pipe,
    a circuit ("a transducer") for transducing the capacitance, for outputting an output of the measuring electrode to a display for displaying a flow rate of a powder,
    wherein the measuring electrode and the transducer are hermetically housed in a casing and are held together with the measuring pipe,
    an atmospheric temperature sensor for measuring the temperature of the atmosphere and a carrier-gas-temperature sensor for measuring the temperature of the carrier gas, and
    a circuit for compensating for the output of the measuring electrode based on the difference between the output of the atmospheric temperature sensor and the output of the carrier-gas-temperature sensor,
    wherein the carrier-gas-temperature sensor is disposed on the measuring pipe at a place that is not affected by the measuring electrode, and that is near the inner wall of the measuring pipe, and
    wherein the atmospheric temperature sensor is disposed so that the sensor can measure the temperature of the atmosphere surrounding the apparatus for measuring a flow rate of a powder.

2. The apparatus for measuring a flow rate of a powder of claim 1, wherein the atmospheric temperature sensor is installed in the casing.

3. The apparatus for measuring a flow rate of a powder of claim 2, wherein the measuring pipe comprises a housing pipe for housing measuring electrodes and a protecting pipe for protecting the measuring electrodes, wherein the protecting pipe is hermetically disposed in the housing pipe, and can be attached to and detached from the housing pipe, and wherein the carrier-gas-temperature sensor is disposed on the outer surface of the protecting pipe by directly attaching the sensor to the protecting pipe.

4. The apparatus for measuring a flow rate of a powder of claim 2, further comprising:
    a connecting block for connecting wires fixed to the protecting pipe, and
    a connected block for being connected by wires fixed to the housing pipe, and comprising wires connected to the transducer,
    wherein the connecting block and the connected block can quickly be connected and disconnected by means of pins and sockets disposed at the connecting and connected block, respectively, and
    wherein the carrier-gas-temperature sensor is installed in the connecting block.

5. A method for measuring a flow rate of a powder by detecting any change of capacitance by means of a measuring electrode, which electrode is disposed around a measuring pipe, wherein the changes are caused by the flow rate of the powder passing through the measuring pipe together with a carrier gas, and wherein the method uses the apparatus that comprises:
    the measuring pipe, through which a powder together with a carrier gas pass, for measuring a flow rate,
    the measuring electrode for measuring changes of capacitance in the measuring pipe, which electrode is disposed around the measuring pipe,
    a transducer for outputting an output of the measuring electrode to a display for displaying a flow rate of a powder,
    wherein the measuring electrode and the transducer are hermetically housed in a casing and are held together with the measuring pipe,
    wherein the casing has an atmospheric temperature sensor, and
    wherein the measuring pipe has a carrier-gas-temperature sensor, which is disposed on the measuring pipe at a place that is not affected by the measuring electrode, and that is near the inner wall of the measuring pipe,
    the method comprising:
    a step for compensating for the output of the measuring electrode based on the difference between the output of an atmospheric temperature sensor and the output of a carrier-gas-temperature sensor.

* * * * *